June 30, 1970     KINICHI NAKAMURA     3,518,019
SYNTHETIC RESIN PENPOINT
Filed April 3, 1969     4 Sheets-Sheet 1
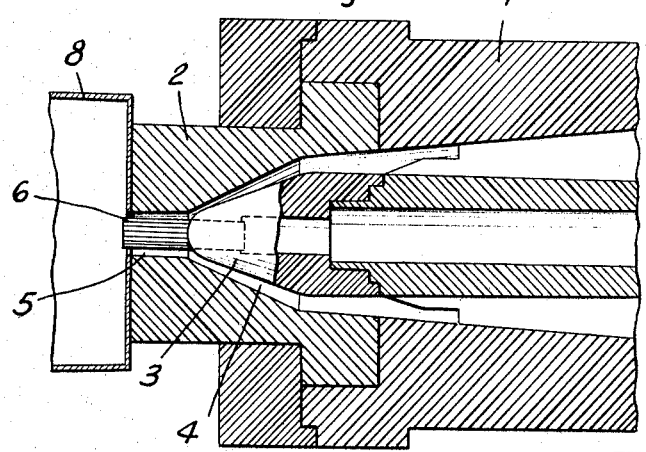
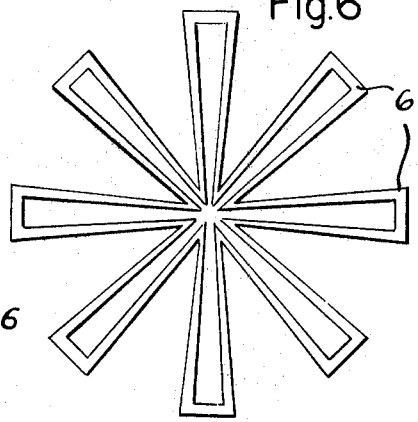
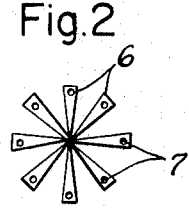
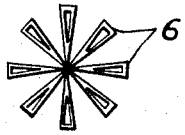
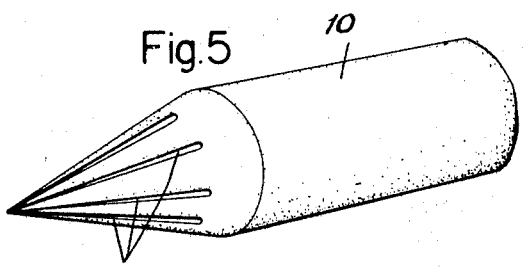
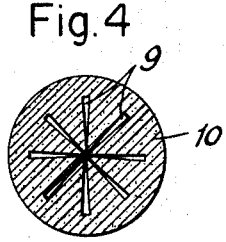

June 30, 1970        KINICHI NAKAMURA        3,518,019

SYNTHETIC RESIN PENPOINT

Filed April 3, 1969        4 Sheets-Sheet 2

INVENTOR
KINICHI NAKAMURA

BY *Wenderoth, Lind & Ponack*

ATTORNEYS

June 30, 1970  KINICHI NAKAMURA  3,518,019
SYNTHETIC RESIN PENPOINT
Filed April 3, 1969  4 Sheets-Sheet 4

INVENTOR
KINICHI NAKAMURA

BY Wenderoth, Lind & Ponack
ATTORNEYS

United States Patent Office 3,518,019
Patented June 30, 1970

3,518,019
SYNTHETIC RESIN PENPOINT
Kinichi Nakamura, 80 Kanaoka, Higashi-Osaka, Japan
Continuation-in-part of application Ser. No. 626,771,
Mar. 29, 1967. This application Apr. 3, 1969, Ser.
No. 826,746
Int. Cl. B43k 1/06
U.S. Cl. 401—265                                   4 Claims

ABSTRACT OF THE DISCLOSURE

A penpoint of synthetic resin and having a tapered pointed tip at one end of a cylindrical body of resin, said body having longitudinally extending radial passages therein extending from the longitudinal central axis radially outwardly to a point short of the peripheral surface thereof and having an increasing width as they extend outwardly. The cylindrical member is made by extruding the resin through an appropriate shaped die having a central member with radially extending parts corresponding to the cross sectional shape of the longitudinally extending holes.

---

This application is a continuation-in-part of application Ser. No. 626,771, filed Mar. 29, 1967 and now abandoned.

This invention relates to a synthetic resin penpoint manufactured by extruding synthetic resin in the shape of a stick, inside which is a bore having a plurality of radial portions each having a generally inwardly tapered cross-section and extending radially of the stick, the said stick being cut in the required lengths and tapered down into a point at one end thereof.

Many of the marking pens which are available on the market are equipped with nibs made of wool felt which is hardened by means of a resin finish and cut in the shape of a penpoint, or are made of slivers or filaments of mostly synthetic resin which are arranged into bundles of parallel fibers by partly binding them with synthetic resin. In case of the above-mentioned penpoints, it is necessary that the capillary spaces existing inside the nib should be uninterruptedly connected with each other for the proper flow of ink, but it is extremely difficult to physically regulate such uninterrupted connection of the capillary spaces in the course of the manufacturing process. Since the result cannot be predetermined, the uninterrupted connection among the capillary spaces inside the nib is apt to be irregular, as a result of which it can hardly be expected that a regular flow of ink for each of the manufactured penpoints will be maintained.

As to the abrasion resistance, such nibs are far from satisfactory owing to separation of fibers composing the felt or loss of the resin itself out of the synthetic fibers. Since it is difficult to write small letters with such nibs, they are regarded as unsuitable for account books, securities and other important documents and are hardly ever used for these purposes.

Another type of penpoint, as disclosed in U.S. Pat. 3,338,216 has an extruded nib, for example of plastic resin which has a bore with a plurality of radially extending portions each having a uniform width cross section. Such a nib will not produce satisfactory flow of ink to a pointed tip on the end thereof due to the different capillary effect of the radial portions and the central portion of such a bore.

It is an object of the present invention to provide a pen nib of the type used in U.S. Pat. 3,338,216 but which has an improved ink flow action.

This object is achieved by providing a nib which is in the form of a hollow tube including a continuous annular portion and a plurality of spaced apart wedge portions integral with said annular portion and extending from said annular portion along the length thereof and tapering toward a central portion of said hollow tube to define a central bore, the hollow tube tapering toward a point at one end thereof. As a result, the ink flows quite smoothly, making this penpoint far easier to write with than any of the available nibs. Moreover, the penpoint of this invention will have semi-permanent durability due to the use of synthetic resin of superior hardness and abrasion resistance, and it can be used for carbon duplication in place of ball-point pens, steel pens and bone pens. Beside, all the radially formed spaces between the wedge portions run through the entire length and the size of the said spaces can be predetermined. Since the ink flowing efficiency is 100%, it is easy to obtain a penpoint which allows the use of ink made of pigment of comparatively rough grains. Furthermore, it has so far been necessary to prepare different materials for the penpoint according to its use whether for oleaginous ink or aqueous ink. On the other hand, the penpoint of this invention is far more convenient because it can be made of the same material for all the different uses.

The particular structure of this invention will be described in greater detail hereafter with reference to the accompanying figures in which:

FIG. 1 is a longitudinal section of the equipment used for the manufacture of the penpoint of this invention.

FIGS. 2 and 3 show front sections of the hole molding members respectively to be fixed inside the above-mentioned equipment.

FIG. 4 is a transverse section of the stick-shaped body extruded from the equipment shown in FIG. 1.

FIG. 5 is an oblique view of the penpoint of this invention.

FIG. 6 is a transverse section of another form of body which can be extruded.

Figure 13A:
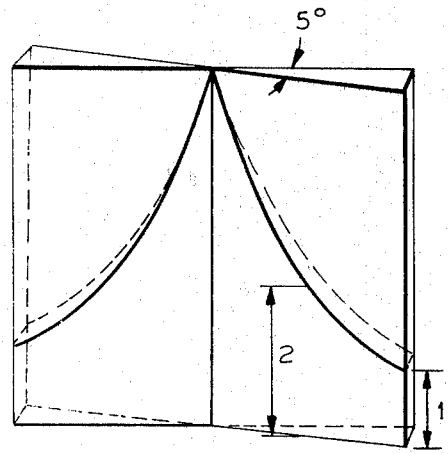
Figure 13B:
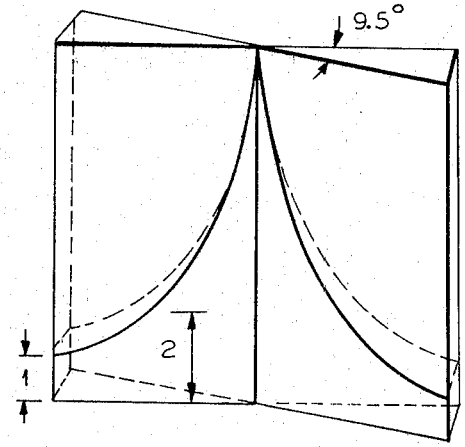
Figure 14:
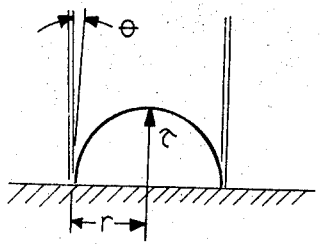
Figure 15:
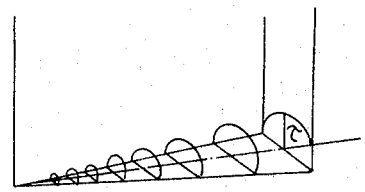
Figure 16:
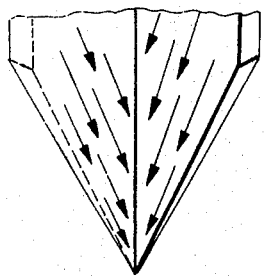
Figure 17:
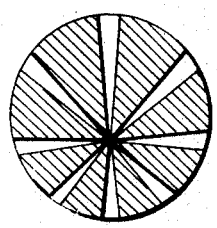
Figure 18:
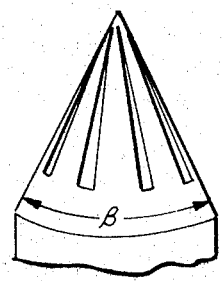
Figure 19:
Figures 20A, 20B, 20C, 20D:
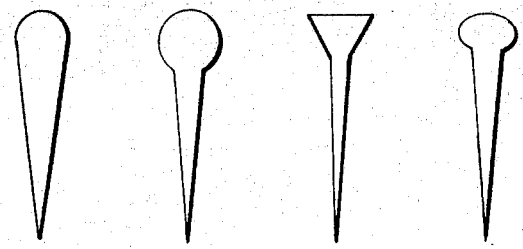
Figures 20E, 20F, 20G, 20H, 20I:
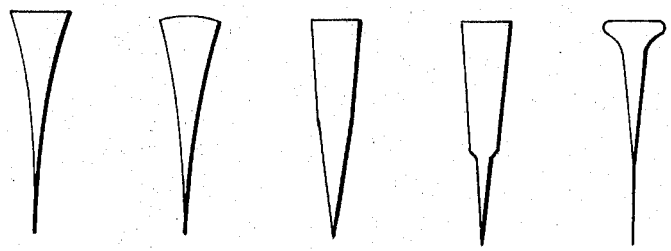

FIGS. 13a and 13b schematic perspective views of wedge shaped bores of different angles and having ink in them;

FIG. 14 is a schematic cross-sectional illustration of the end of a penpoint in contact with a surface;

FIG. 15 is a schematic perspective view of a wedge-shaped slot in contact with a surface;

FIG. 16 is a schematic perspective view of ink flowing in a wedge-shaped slot;

FIG. 17 is a cross-sectional view of a tip portion of the pen point of the invention after it has worn;

FIG. 18 is a perspective view of the shapened tip of the penpoint of the invention;

FIG. 19 is a schematic elevation view of a writing instrument composed of a penpoint and a reservoir which is an assembly of capillary tubes; and FIGS. 20a–20i are diagrammatic views of various cross-sectional shapes wedge-shaped slots falling within the scope of the present invention.

In FIG. 1, the numeral 1 designates the extruder, an outer die 2 being fixed to the front end thereof, a hollow inner die 3 being provided inside the said outer die 2, and a tapering space 4 being formed between the outer die 2 and the inner die 3.

The front end of the outer die 3 is provided with an extruding hole 5 leading to the space 4, from the inside of which protrudes the hole molding member 6 inserted into the inner die 3, the tip of the said member 6 being so arranged that it protrudes forward about 0.3 mm. from the front end of the outer die 2.

The said member 6 may be either in the shape of flat wedges each having a slender equilateral triangular section each with a hole running through each wedge lengthways as shown by FIG. 2, or in the shape of flat and tubular wedges each having an equilateral triangle both for its inner and outer peripheries, as shown by FIG. 3.

FIG. 6 shows another embodiment in which all the members 6 are integrally join together at the center, the holes in such members also joining together at the center. In other words, the member constitutes a piece of tube with a zigzag periphery, the entire body having a hollow, star-shaped section.

A cooling water tank 8e is provided at the front part of the outer die 2.

When the melted heat-plastic synthetic resin is fed from behind the extruder 1 and forced toward the space 4, the synthetic resin is forced out of the extruding hole 5, enveloping the hole molding member 6 provided at the front end of the in-die 3. During this process, the cooling effect gradually proceeds, and a stick-shaped molded piece 10 can be obtained which as shown in FIGS. 4 and 5, is in the form of a hollow tube having a continuous annular portion 10a, and a plurality of spaced apart wedge parts 10b integral with said annular portion 10a and extending from said annular portion along the length thereof and tapering toward a central portion of said hollow tube. The spaces between the wedge portions 10b form radial wedge-shaped holes 9 running through the center, molded by the member 6 inside the apparatus. The said stick-shaped molded piece 10, immediately after it is forced out of the extruding hole 5 and before it hardens completely, is extended and given a required outer diameter by passing it through an appropriate sizing die.

Besides, during the above-mentioned operation, by means of continuously applying a slightly higher pressure than the outside atmospheric pressure to the member 6 through the hollow inner die 3 from behind the extruding machine 1, air is constantly sent into the holes 9 of the stick-shaped molded piece 10 forced out of the extruding hole 5. This process prevents the holes 9 formed inside the molded piece 10 from becoming vacuous and blocked when it has passed the end of the member 6.

The stick-shaped molded piece 10 which has been thus extruded continuously with minute holes extending through the entire body is cut in required lengths. Then, by tapering each into a sharp point 10c, at one end a penpoint with all the holes 9 concentrated at the tip as shown by FIG. 5 can be obtained.

The aforementioned wedge-shaped holes are an important factor which contribute to the superiority of the penpoint of this invention. In order to make clear why this feature is important, reference will first be made to the theory of the capillary action of fluid according to classical physics.

This theory is particularly important with regard to a penpoint wherein geometrically arranged slots are utilized as ink flow grooves, since the suction of ink to the penpoint is nothing other than elevation of ink by capillary action. The writing means to transfer to paper the ink which has been moved to the penpoint, by capillary action, and the portion of the penpoint which is in contact with paper must be extremely small in order to be able to make fine lines. Consequently, in order to cause ink to flow by capillary action in such a manner as will meet the foregoing requirement, it is necessary to cause the ink to flow not in a simple rectilinear direction through the slots in the penpoint, but rather in such a manner that it will be concentrated toward the central part of the penpoint. It is only when this type of flow is produced that the writing implement is highly effective.

In the present invention, therefore, the shape of the slot has been determined based upon the theory of the fluid surface elevation owing to capillary action according to classical physics, and application of this theory constitutes the key point of the present invention.

In classical physics the elevation of a fluid surface owing to capillary action can be described by the following formula:

$$gh = \gamma \cos \theta \left(\frac{1}{R_1} + \frac{1}{R_2}\right) \qquad (1)$$

$\rho$: fluid density
$g$: physical constant
$h$: height of fluid surface
$\gamma$: fluid surface tension
$\theta$: contact angle between the fluid and the internal wall of the capillary $R_1$ and $R_2$ curvature radii of menisci formed by fluid Formula 1 changes, depending on the shape of the capillary.

Figure 7:
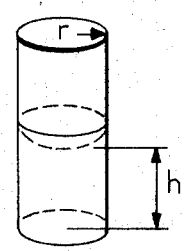
FIG. 7 is a perspective view, on an enlarged scale, of a cylindrical capillary with liquid therein.

For a tubular capillary as shown in FIG. 7:

$$R_1 = R_2 = Y$$

$Y$ = capillary radius $$\rho g h = \frac{2\gamma}{r} \cos \theta$$

$$h = \frac{2\gamma}{\rho g} \cdot \frac{1}{r} \cos \theta \qquad (2)$$

Figure 9:
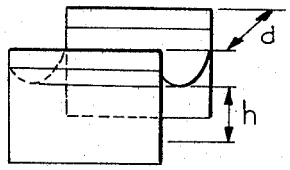
FIG. 9 is a similar view of a capillary between two parallel sheets of glass.
Figure 8:
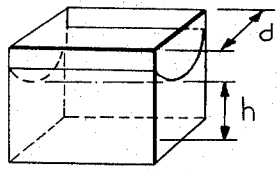
FIG. 8 is a perspective view, on an enlarged scale, of an oblong capillary with liquid therein.

For an oblong capillary or a capillary in the shape of a space between two parallel sheets of glass, as shown in FIGS. 8 and 9:

$$\rho g h = \frac{4\gamma}{d} \cos \theta$$

$$h = \frac{4\gamma}{\rho g} \cdot \frac{1}{d} \cos \theta \qquad (3)$$

Figure 10:
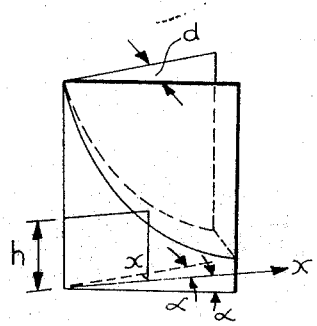
FIG. 10 is a similar view of a capillary between two sheets of glass placed at an angle to each other.

For a capillary in the shape of the space between two sheets of glass placed at an angle to each other as shown in FIG. 10, if the angle formed by the two internal walls is represented by $2\alpha$, the height of fluid at an arbitrary point in the direction of the axis $\chi$ is $$h = \frac{2\gamma}{\rho g} \cdot \frac{1}{\chi \tan \alpha} \cos \theta \qquad (4)$$

It will be seen that this formula can be applied to the wedgeshaped holes 9 in the penpoint of the present invention.

Figure 11:
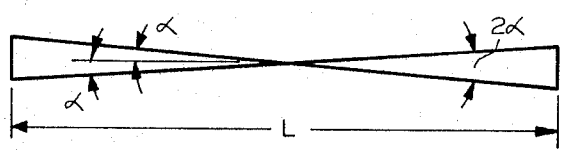
FIGS. 11 and 12 are diagrammatic views of the wedge-shaped slots in the penpoint of the present invention.

As shown in FIG. 11, the wedge-shaped slots of the penpoint of the present application have a cross-section in the form of an equilateral triangle tapering toward the central axs of the pinpont. The angle $2\alpha$ at its apex is preferably within the range of 5.0° to 9.5°. With the angle in this range, the penpoint can handle all kinds of ink well. It has been also ascertained that the appropriate length L of the slot is preferably approximately 0.0630 inch. Consequently, the height of the equilateral triangle, viz L/2, is 0.0315 inch.

The slot of the present application is thus in the shape of a tapering capillary tube, and Formula 4 can be used for the calculation of various values. The height of the fluid surface rises parabolically as the width $\alpha$ of the capillary nears zero as shown in FIG. 13. An actual calculation for three points, A, B, and C, as indicated in FIG. 12 shows that a point C, viz at the central point, the height of the fluid surface is theoretically infinite.

Figure 12:
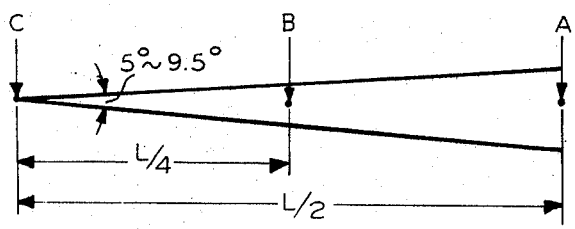

In FIG. 12, if X at

Point $A = L/2 = 0.0315$ inch
Point $B = L/4 = 0.0157$ inch
Point $C = 0$ and angle $2\alpha d\ 5°$, $$\alpha = 2.5°$$
$$\tan \alpha = 2.5 = 0.044$$

0.0315 inch=0.0026246 feet
0.0157 inch =0.0013123 feet and then the height of the fluid surface will be in respect of point A.

$$h = \frac{2\gamma}{\rho g} \cdot \frac{1}{\chi \tan \alpha} \cos \theta$$

$$= \frac{2 \times 0.099208}{65.544 \times 32.174} \cdot \frac{i}{0.0026246 \times 0.044} \times 12$$

$$h = 9.78 \text{ inches}$$

in respect of point B $$h = 19.55 \text{ inches}$$

(through the same process) and in respect of point C $$h = \infty$$

The height of the fluid surface where angle $2\alpha = 9.5°$ will be:

$$\alpha = 4.75°$$

$$\tan \alpha = \tan 4.75 = 0.083$$

in respect of point A $$h = \frac{2\gamma}{\rho g} \cdot \frac{1}{\chi \tan \alpha} \cos \theta$$

$$= \frac{2 \times 0.099208}{65.544 \times 32.174} \cdot \frac{i}{0.0026246 \times 0.083} \times 12$$

$$h = 5.18 \text{ inches}$$

in respect of part B $$h = 10.37 \text{ inches}$$

(through the same process) and in respect of part C $$h = \infty$$

As shown in FIGS. 13a and 13b, the present invention is characterized by the tapered shape of the slot, and therefore, irrespective of the degree of angle $2\alpha$ shown in FIGS. 11 and 12, the height of increases as the fluid nears the central axis of the penpoint, the height being theoretically infinite at the central axis. When the arbitrary point in Formula 4 is at the point $L/4$, viz point B, the height of the fluid surface is twice that of the fluid surface at the point $L/2$, viz point A. It follows from these facts, therefore, that the height $h$ of the fluid surface at each point indicated in FIG. 12 will theoretically be $h_A \gg h_B \gg h_C$. This is one of the important features of the present invention. Actually the height at point C will have a definite value because in practice there is a small axial bore along the penpoint.

A further feature of the wedge-shaped slot of the penpoint of the present invention is the improvement in transferring ink from the penpoint to paper or other materials.

According to classical physics, the radii of curvature $R_1$ and $R_2$ which form the menisci in Formula 1 are different depending on the kind of fluid, and moreover when the values are calculated according to Formula 1, the contact angle $\theta$ at which the fluid surface contacts the inside wall of a capillary tube can generally be ignored, and therefore, in the case of the capillary tube of FIG. 7

$$R_1 = R_2 = r$$

and in the case of FIGS. 8 and 9

$$R_2 \gg R_1 = \alpha/2$$

and in the case of FIG. 10 the value of at an arbitrary point is considered to be same as in the case of FIGS. 8 and 9.

In practice, the radii of curvature $R_1$ and $R_2$ are equal to the radius in the case of a cylindrical capillary tube and equal to one half the width of the slot in case of a capillary tube having an oblong or any other similar cross-sectional shape.

Accordingly, when the end of the penpoint out of which opens a wedge-shaped capillary is brought in to contact with paper, as illustrated schematically in FIG. 14, the space between surface and the fluid surface at the central part of the capillary is represented by $$\tau = r \text{ or } \tau = \alpha/2$$

Because of the taper of the wedge-shaped slot of the penpoint of the present invention, at the central axis of the penpoint, which constitutes the most important part for writing, the width of the slot theoretically nears zero, and therefore the space $\tau$ also nears zero as illustrated in FIG. 15. The slot width $\alpha$ at any arbitrary point $\chi$ increases toward the external periphery of the penpoint, with the result that $\tau$ is necessarily increased accordingly, the ratio being $\alpha/2$. But because the tip of the penpoint is tapered rearwardly, this increase occurs where there is no direct contact of the penpoint with the paper surface, and it causes no decrease whatsoever in the flow of ink from the writing implement having a penpoint with a slot according to the present invention.

A further feature of the penpoint of the present invention is that with the wedge-shaped slot as shown in FIG. 16, downward and toward the center, of the penpoint the inkflow is of a downward movement. This is due to the capillary action drawing the ink down toward the center of the penpoint.

The wedge-shaped slot of the penpoint of the present invention tapers toward the center of the penpoint, with the width D approaching zero at the central axis. As a result, if the pen pressure is zero, the ink movement downward and toward the center so small that it is almost no exaggeration to state that hardly any ink flow out of the penpoint at the moment when the tip of the penpoint is brought in to contact with the surface of paper. However, immediaely when pressure is applied by the writer, the ink starts to move continuously downward toward the center of the pen point, the ink flow being easily controllable by the pressure applied to the penpoint.

In this respect, it may be said that the external peripheral part of the tapering slot serves as a tank to supply ink to the central part, controlling the ink flow in accordance with the pressure applied to the penpoint.

The penpoint of the present invention also has superior characteristics even after it has worn. As shown in FIG. 17, in which one side has been worn away after being in contact with paper or the like at an angle of from 50° to 70° during writing, although the peripheral surface of the peripheral surface of the wedges defining the wedge-shaped slots is smaller after it is worn away, it is not decreasing in size any faster than the slots themselves, due to the fact that the slots are growing smaller as they taper toward the axis of the penpoint. Therefore, even when the penpoint is worn, the pressure per unit area does not become excessive, because the surface area of the wedges has not decreased relative to the area of the slots. Thus, the wear resistance of the penpoint is enhanced.

With respect to the width of the line obtainable with the penpoint of this invention, since the slots are tapered as shown in FIG. 18, there is theoretically no central hole along the axis of the penpoint, and therefore the tip of the penpoint must be sharp irrespective of the manner of cutting and the angle $\beta$. Actually there is a very small axial bore, but it is so small that it does not materially reduce the sharpness of the point. The penpoint of the present invention, therefore, can produce a far more slender line than can prior art points.

The penpoint of the present invention will keep ink at the tip thereof, regardless of the position of writing instrument. In writing instruments wherein capillary action is taken advantage of to feed the ink particularly when capillary tubes are geometrically arranged inside the plastic penpoint and also with a fibrous penpoint, if the writing instrument is left standing with its penpoint upward after assembling process, it frequently happens that the ink flows down, making it impossible to write with the instrument immediately. It has also been ascertained that this phenomenon very often occurs with the penpoint after the writing implement has been used for some time.

Experiments to determine the factors involved in the foregoing phenomenon have disclosed the fact that the ink descent depends upon the slot with as well as the slot shape. In an instrument as shown in FIG. 19, in which ink absorbed by the reservoir is sent to the tip of the penpoint by capillary action so that the penpoint will always be ready for writing, there is also a very important problem of the ink descent from the relation between the capillary action of the penpoint and that of the reservoir which is an aggregation of capillary tubes.

When the ink holding power of the penpoint by the capillary action thereof is inferior to that of the reservoir, there is a tendency for the ink descending phenomenon to become very bad.

With a wedge-shaped tapering slot, the width nears zero toward the central axis of the penpoint, with the result that the capillary action in the portion adjacent to the central axis is very strong. Because the width approaches zero, and because the size of the capillaries in the reservoir never approach zero, the capillary force acting on the ink in the slots in the penpoint will always be greater than that acting in the reservoir, so that ink will always be drawn toward the tip of the penpoint, regardless of the position of the writing instrument.

The shape of the slot as shown in FIGS. 1–19, i.e. a triangular wedge, is not the only wedge shape which is considered to fall within the expression "wedge-shaped slot" according to the present invention. FIGS. 20a–20i show alternative cross-sectional shapes for the slots. It will be seen that all of them are tapered along substantially the entire radial dimension. The taper is not defining between them generally wedge-shaped slots which become narrower as they taper radially inwardly and which necessarily uniform, as is clear from FIGS. 20c, and 20e. All of the shapes however, can be said to be generally wedge-shaped. It is contemplated that all of them and all equivalent shapes lie within the meaning of the term "generally wedge-shaped."

What is claimed is:
1. A penpoint consisting of a tube having a continuous annular portion and a plurality of spaced apart wedge portions integral with said annular portion and extending from said annular portion along the length thereof and tapering toward and substantially together at the central axis of said tube, said tube tapering toward a point at one end thereof, said wedge portions having side surfaces defining between them generally wedge-shaped slots which become narrower as they taper radially inwardly and which extend along the entire length of said tube and are tapered along substantially the entire radial dimension of said slots.

2. A penpoint as claimed in claim 1 in which said penpoint is of an extruded synthetic resin.

3. A penpoint as claimed in claim 1 in which the angle taper of said slots is from 5–9°.

4. A stick-shaped body adapted to be formed into a penpoint, said body consisting of a tube including a continuous annular portion and a plurality of spaced apart wedge portions integral with said annular portion and extending from said annular portion along the length thereof and tapering toward and substantially together at the central axis of said tube, said wedge portion having side surface extend along the entire length of said tube and are tapered along substantially the entire radial dimension of said slots, said stick being capable of being formed into a penpoint by tapering one end toward a point.

References Cited

UNITED STATES PATENTS

| 3,306,267 | 2/1967 | Matsumoto | 401—292 XR |
| 3,338,216 | 8/1967 | Roller | 401—292 XR |
| 3,424,539 | 1/1969 | Jenkins | 15—447 XR |

WALTER A. SCHEEL, Primary Examiner

R. I. SMITH, Assistant Examiner

U.S. Cl. X.R.

15—446